(12) United States Patent
Taguchi

(10) Patent No.: US 8,301,341 B2
(45) Date of Patent: Oct. 30, 2012

(54) TRAVEL CONTROL DEVICE AND VEHICLE

(75) Inventor: Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 254 days.

(21) Appl. No.: 12/738,491

(22) PCT Filed: Oct. 16, 2008

(86) PCT No.: PCT/JP2008/068773
§ 371 (c)(1),
(2), (4) Date: Apr. 16, 2010

(87) PCT Pub. No.: WO2009/051190
PCT Pub. Date: Apr. 23, 2009

(65) Prior Publication Data
US 2010/0217486 A1 Aug. 26, 2010

(30) Foreign Application Priority Data
Oct. 17, 2007 (JP) ................................ 2007-270512

(51) Int. Cl.
*B62D 6/00* (2006.01)
(52) U.S. Cl. .......................................................... 701/41
(58) Field of Classification Search ............... 701/41, 701/51, 53, 54, 55
See application file for complete search history.

(56) References Cited

U.S. PATENT DOCUMENTS

| | | | |
|---|---|---|---|
| 4,834,045 A * | 5/1989 | Imai et al. ...................... 123/352 |
| 5,625,558 A * | 4/1997 | Togai et al. ...................... 701/93 |
| 6,078,860 A * | 6/2000 | Kerns .............................. 701/93 |
| 6,112,719 A * | 9/2000 | Earleson ......................... 123/352 |
| 2011/0184619 A1 * | 7/2011 | Kamata et al. .................. 701/70 |
| 2011/0193693 A1 * | 8/2011 | Filev et al. ..................... 340/435 |
| 2011/0196591 A1 * | 8/2011 | Kuze .............................. 701/96 |
| 2011/0295464 A1 * | 12/2011 | Zagorski et al. ................ 701/41 |

(Continued)

FOREIGN PATENT DOCUMENTS

DE    103 27 950 A1    2/2004

(Continued)

OTHER PUBLICATIONS

Office Action issued Apr. 26, 2012, in German Patent Application No. 11 2008 002 789.7.

*Primary Examiner* — Faye M. Fleming
(74) *Attorney, Agent, or Firm* — Oblon, Spivak, McClelland, Maier & Neustadt, L.L.P.

(57) ABSTRACT

Disclosed is a travel control device for easily achieving a target acceleration/deceleration even by a manual operation of a driver. A travel control device for controlling at least acceleration/deceleration of a vehicle includes acceleration/deceleration characteristic setting means for setting the range of an accelerator operation amount or a brake operation amount corresponding to an induced target acceleration/deceleration greater than the range of an accelerator operation amount or a brake operation amount corresponding to an acceleration/deceleration other than the induced target acceleration/deceleration. The acceleration/deceleration characteristic setting means generates a map GM1 in which the range of the accelerator operation amount or the brake operation amount corresponding to the acceleration/deceleration for achieving the induced target acceleration/deceleration is set greater than a basic map BM1, which defines the relationship between the accelerator operation amount and the acceleration/deceleration corresponding to the accelerator operation amount and the relationship between the brake operation amount and the acceleration/deceleration corresponding to the brake operation amount.

6 Claims, 6 Drawing Sheets

U.S. PATENT DOCUMENTS

| | | | |
|---|---|---|---|
| 2012/0007418 A1* | 1/2012 | Furuyama | 303/11 |
| 2012/0022750 A1* | 1/2012 | Matsuda | 701/51 |

FOREIGN PATENT DOCUMENTS

| | | |
|---|---|---|
| DE | 60 2005 004 330 T2 | 1/2009 |
| EP | 1 832 485 A1 | 9/2007 |
| JP | 60-1335 | 1/1985 |
| JP | 63-25355 | 2/1988 |
| JP | 10-151967 | 6/1998 |
| JP | 2001-73839 | 3/2001 |
| JP | 2001-238306 | 8/2001 |
| JP | 2003-137126 | 5/2003 |
| JP | 2004-50904 | 2/2004 |
| JP | 2006-42528 | 2/2006 |
| JP | 2007-38750 | 2/2007 |
| JP | 2007-269307 | 10/2007 |

\* cited by examiner

TRAVEL CONTROL DEVICE AND VEHICLE

TECHNICAL FIELD

The present invention relates to a travel control device for controlling at least acceleration/deceleration of a vehicle, and to a vehicle.

BACKGROUND ART

In recent years, to reduce the burden imposed on a driver, a device has been developed which provides various kinds of driving assist to the driver. In an ACC [Adaptive Cruise Control] device which enables automatic acceleration/deceleration control of a vehicle, when there is a preceding vehicle, acceleration/deceleration control is performed such that an appropriate inter-vehicle distance (time) from the vehicle to the preceding vehicle is maintained, and when there is no preceding vehicle, acceleration/deceleration control is performed such that a set vehicle speed is maintained. Meanwhile, to perform acceleration/deceleration according to a manual operation of a driver, for example, Patent Citation 1 describes a method which searches a requested torque map in accordance with the opening degree of an accelerator by the driver to obtain the requested torque, when it is determined from a comparison of the current requested torque with a requested torque after smoothing that it is an acceleration state, calculates an acceleration assist amount in accordance with the difference between the current requested torque and the requested torque after smoothing, and adds the acceleration assist amount to the requested torque after smoothing to set a target torque.

[Patent Citation 1] Japanese Unexamined Patent Application Publication No. 2001-73839
[Patent Citation 2] Japanese Unexamined Patent Application Publication No. 2006-42528
[Patent Citation 3] Japanese Unexamined Patent Application Publication No. 2001-238306
[Patent Citation 4] Japanese Unexamined Patent Application Publication No. 2004-50904

DISCLOSURE OF INVENTION

Technical Problem

In the case of automatic acceleration/deceleration control of the related art, such as the ACC device, collaborative control with an accelerator operation or a brake operation of the driver may not be performed, and either automatic driving or manual driving is preferentially carried out. Accordingly, under the control of the ACC device, when the driver carries out an accelerator operation or a brake operation, acceleration/deceleration is carried out on the vehicle in accordance with the manual operation of the driver. For this reason, even when an appropriate target acceleration/deceleration is set by the ACC device or the like, if the accelerator operation or brake operation by the driver is input, acceleration/deceleration is carried out in accordance with the manual operation, regardless of the target acceleration/deceleration. As a result, the target acceleration/deceleration may not be easily achieved by the manual operation of the driver.

Accordingly, an object of the invention is to provide a travel control device capable of easily achieving a target acceleration/deceleration even by a manual operation of a driver, and a vehicle.

Technical Solution

An aspect of the invention provides a travel control device for controlling at least acceleration/deceleration of a vehicle. The travel control device includes acceleration/deceleration characteristic setting means for setting the range of an accelerator operation amount or a brake operation amount corresponding to a target acceleration/deceleration greater than the range of an accelerator operation amount or a brake operation amount corresponding to an acceleration/deceleration other than the target acceleration/deceleration.

In the travel control device, the acceleration/deceleration characteristic means sets the range of the accelerator operation amount or the brake operation amount corresponding to the target acceleration/deceleration greater than the range of the accelerator operation amount or the brake operation amount corresponding to the acceleration/deceleration other than the target acceleration/deceleration. Thus, when the acceleration/deceleration is near the target acceleration/deceleration, the acceleration/deceleration is unlikely to change with respect to the accelerator operation amount or the brake operation amount of the driver. That is, in the region of the target acceleration/deceleration, the amount of change in the acceleration/deceleration is smaller than the amount of change in the accelerator operation amount or the brake operation amount. The target acceleration/deceleration is a target acceleration/deceleration (including an acceleration/deceleration range having a predetermined width) for vehicle traveling, and is, for example, a target acceleration/deceleration which is set by the ACC device. Thus, in the travel control device, even when a manual operation (accelerator operation or brake operation) of the driver is carried out, traveling at the target acceleration/deceleration can be easily carried out. Meanwhile, in the region of the acceleration/deceleration other than target acceleration/deceleration, the amount of change in the acceleration/deceleration becomes larger than the amount of change in the accelerator operation amount or the brake operation amount, as compared with near the target acceleration/deceleration. Therefore, in the travel control device, if change to the acceleration/deceleration other than the target acceleration/deceleration is made by the manual operation of the driver, the acceleration/deceleration easily changes in accordance with the manual operation of the driver, and thus acceleration/deceleration intended by the driver is facilitated.

The travel control device of the invention may further include a basic map which defines the relationship between the accelerator operation amount and the acceleration/deceleration corresponding to the accelerator operation amount and the relationship between the brake operation amount and the acceleration/deceleration corresponding to the brake operation amount. The acceleration/deceleration characteristic setting means may set the range of the accelerator operation amount or the brake operation amount corresponding to the acceleration/deceleration for achieving the target acceleration/deceleration greater than the basic map.

In the travel control device, the basic map is prepared which represents the relationship between the general accelerator operation amount and brake operation amount and the acceleration/deceleration, and the acceleration/deceleration characteristic setting means sets the range of the accelerator operation amount or the brake operation amount corresponding to the target acceleration/deceleration greater than the basic map. Therefore, in the region of the target acceleration/deceleration, the acceleration/deceleration is hard to change with respect to the accelerator operation amount or the brake operation amount, as compared with the general acceleration/deceleration characteristics. As a result, traveling at the target acceleration/deceleration can be easily carried out.

The travel control device of the invention may further include steering characteristic setting means for setting the range of a steering operation amount corresponding to a target tire angle greater than the range of a steering operation amount corresponding to a tire angle other than the target tire angle. When the rear portion of the vehicle skids, the steering characteristic setting means may set the range of the steering operation amount corresponding to the target tire angle for suppressing or/and maintaining skidding greater, and when the rear portion of the vehicle skids, the acceleration/deceleration characteristic setting means may set the range of the accelerator operation amount or the brake operation amount corresponding to the target acceleration/deceleration for maintaining skidding greater.

In the travel control device, the steering characteristic setting means sets the range of the steering operation amount corresponding to the target tire angle greater than the range of the steering operation amount corresponding to the tire angle other than the target tire angle. Thus, when the tire angle is near the target tire angle, the tire angle is hard to change with respect to the steering operation amount by the driver. That is, in the region of the target tire angle, the reduction gear ratio in the steering mechanism increases, and the amount of change in the tire angle decreases with respect to the amount of change in the steering operation amount. The target tire angle is a target tire angle (including a tire angle range having a predetermined width) for vehicle traveling, and is, for example, the range of a tire angle necessary for inducing the vehicle to a target trace. Therefore, in the travel control device, even when the manual operation (steering operation) of the driver is made, traveling at a target tire angle can be easily carried out, and induction to a target trace or the like can be carried out. To the contrary, in the region of the tire angle other than the target tire angle, the reduction gear ratio of the tire angle with respect to the steering operation amount decreases and the amount of change in the tire angle increases with respect to the amount of change in the steering operation amount, as compared with near the target tire angle. As a result, in the travel control device, if change to the tire angle other than the target tire angle is made by the manual operation of the driver, the tire angle easily changes in accordance with the manual operation of the driver, and steering intended by the driver is facilitated.

In particular, when the rear portion of the vehicle skids, in the travel control device, the steering characteristic setting means sets the range of the steering operation amount corresponding to the target tire angle for suppressing skidding greater. The tire angle for suppressing skidding can be easily induced by the manual operation of the driver, and the spin state can be prevented. In addition, when the rear portion of the vehicle skids to an extent such that the spin state does not occur, in the travel control device, the steering characteristic setting means sets the range of the steering operation amount corresponding to the target tire angle for maintaining skidding greater, and the acceleration/deceleration characteristic setting means sets the range of the accelerator operation amount or the brake operation amount corresponding to the target acceleration/deceleration for maintaining skidding greater. Therefore, the tire angle and the acceleration/deceleration for maintaining skidding can be easily induced by the manual operation of the driver, and traveling can be easily carried out while maintaining the tail slide state (over-steering state). As a result, vehicle control in the limit state of the vehicle can be easily performed even by the manual operation of the driver, and the driver can improve driving skills or can experience enjoyable driving (Fun to Drive). Incidentally, from the viewpoint of safety (for example, a wall or obstacle is nearby), traveling is maintained while permitting skidding, as compared with a case where skidding is immediately eliminated.

Another aspect of the invention provides a travel control device which controls at least acceleration/deceleration of a vehicle. As an acceleration or a deceleration according to an operation input by a driver approaches a target acceleration or a target deceleration, sensitivity to the operation input by the driver is lowered. With this travel control device, even when the operation of the driver is made, traveling at a target acceleration/deceleration can be easily carried out.

Yet another aspect of the invention provides a travel control device which controls at least acceleration/deceleration of a vehicle. As the inter-vehicle distance from the vehicle to a preceding vehicle increases, acceleration responsiveness to an accelerator operator input by a driver increases.

Yet another aspect of the invention provides a vehicle which controls at least acceleration or deceleration. As an acceleration or a deceleration according to an operation input by a driver approaches a target acceleration or a target deceleration, sensitivity to the operation input by the driver is lowered. With this vehicle, even when the operation of the driver is made, traveling at a target acceleration/deceleration can be easily carried out.

Yet another aspect of the invention provides a vehicle which controls at least acceleration/deceleration. As the inter-vehicle distance from the vehicle to a preceding vehicle increases, acceleration responsiveness to an accelerator operator input by a driver increases.

Advantageous Effects

According to the invention, the acceleration/deceleration characteristics with respect to the accelerator operation amount and the brake operation amount are adjusted, such that the target acceleration/deceleration can be easily achieved even by the manual operation of the driver.

EXPLANATION OF REFERENCES

Figure 1:
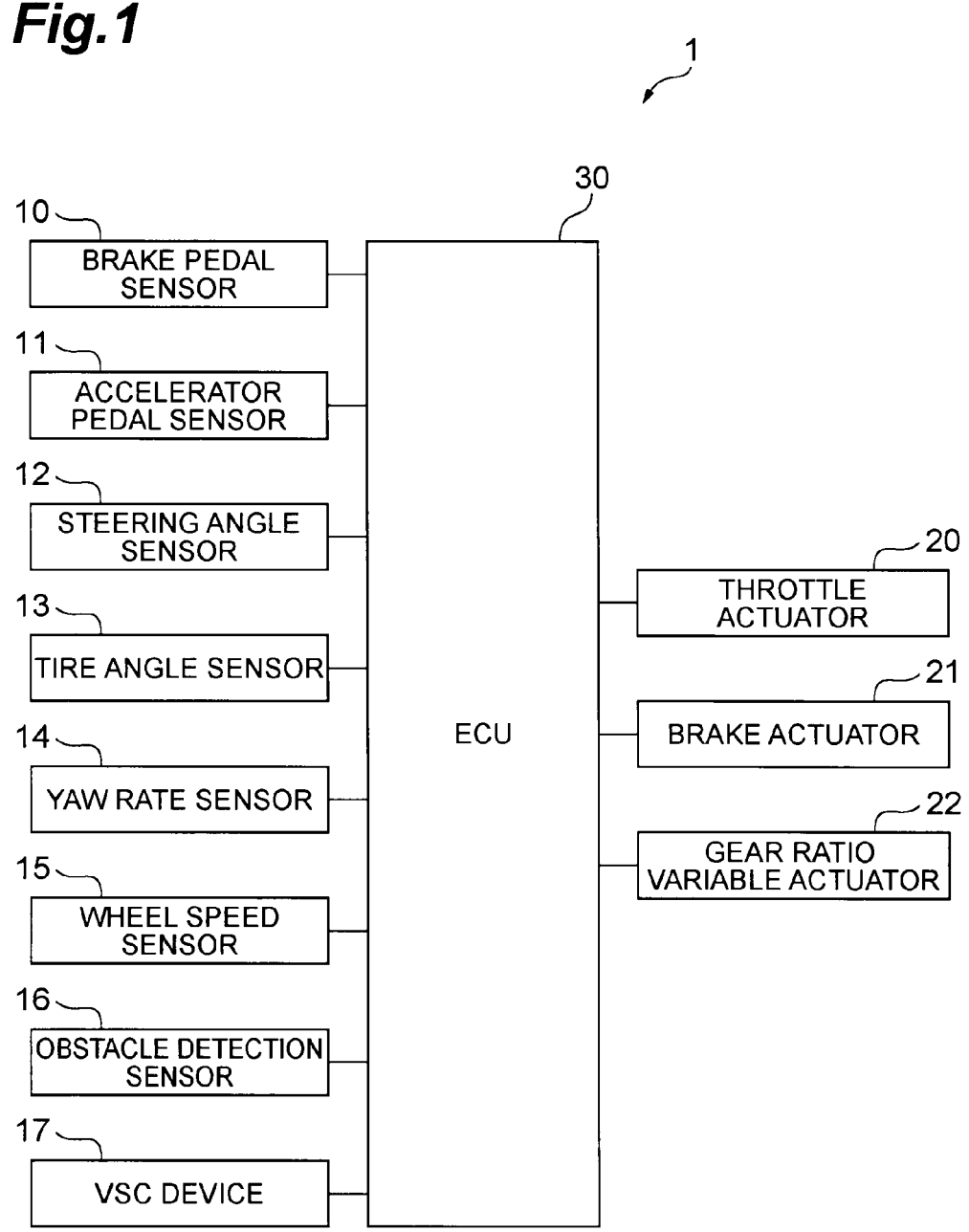
FIG. 1 is a configuration diagram of a driving assist device of this embodiment.

1: driving assist device
10: brake pedal sensor
11: accelerator pedal sensor
12: steering angle sensor
13: tire angle sensor
14: yaw rate sensor
15: wheel speed sensor
16: obstacle detection sensor
20: throttle actuator 21: brake actuator
22: gear ratio variable actuator
30: ECU

BEST MODE FOR CARRYING OUT THE INVENTION

Hereinafter, a travel control device according to an embodiment of the invention will be described with reference to the drawings.

In this embodiment, a travel control device of the invention is applied to a driving assist device which is mounted in a vehicle. A driving assist device of this embodiment carries out driving assist (collaborative control of manual driving and automatic driving) from the vehicle side with respect to a manual operation of a driver. The driving assist device of this embodiment has at least an acceleration/deceleration control function for easily achieving an induced target acceleration/deceleration even by a manual operation of a driver, a steering control function for easily achieving an induced target even by a manual operation of a driver, and a tail slide traveling control function for easily carrying out tail slide traveling even by a manual operation of a driver.

Figure 2:
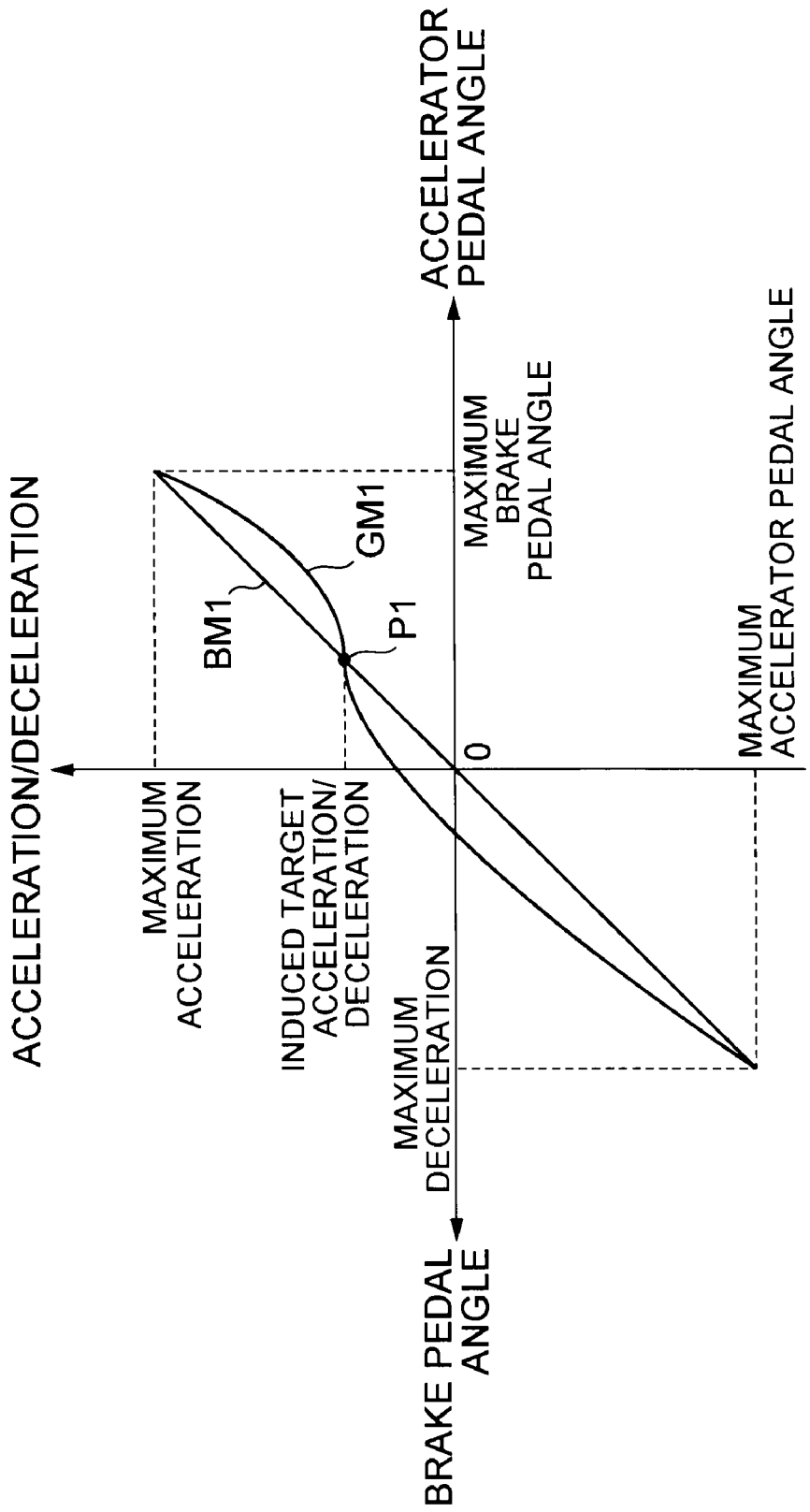
FIG. 2 shows an example of an accelerator angle/brake angle-acceleration/deceleration correspondence map of this embodiment.
Figure 3:
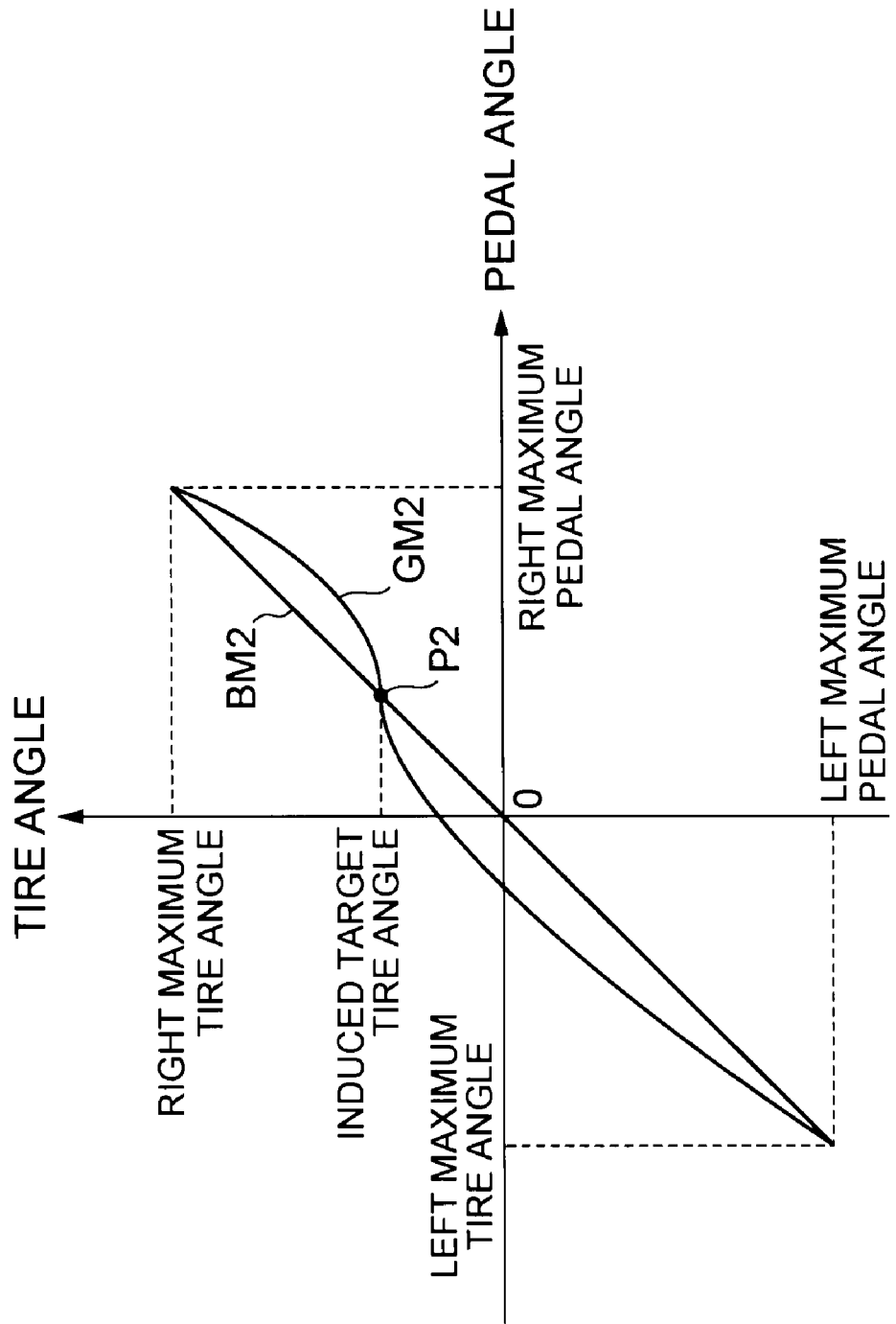
FIG. 3 shows an example of a steering wheel angle-tire angle correspondence map.

A driving assist device 1 of this embodiment will be described with reference to FIGS. 1 to 3. FIG. 1 is a configuration diagram of a driving assist device of this embodiment. FIG. 2 shows an example of an accelerator angle/brake angle-acceleration/deceleration correspondence map of this embodiment. FIG. 3 shows an example of a steering wheel angle-tire angle correspondence map of this embodiment.

The driving assist device 1 changes the acceleration/deceleration characteristics with respect to an accelerator pedal angle (accelerator operation amount) and a brake pedal angle (brake operation amount) in accordance with an induced target acceleration/deceleration, and performs acceleration/deceleration control to control a throttle opening degree and wheel cylinder pressure. The driving assist device 1 also changes tire angle characteristics with respect to a steering wheel angle (steering operation amount) in accordance with an induced target tire angle, and performs steering control to control a gear ratio (tire angle) in a steering mechanism. The driving assist device 1 also performs tail slide traveling control using acceleration/deceleration control and operation control. To this end, the driving assist device 1 includes a brake pedal sensor 10, an accelerator pedal sensor 11, a steering angle sensor 12, a tire angle sensor 13, a yaw rate sensor 14, a wheel speed sensor 15, an obstacle detection sensor 16, a throttle actuator 20, a brake actuator 21, a gear ratio variable actuator 22, and an ECU [Electronic Control Unit] 30. The driving assist device 1 uses information from a VSC [Vehicle Stability Control] device 17. In this embodiment, respective processing in the ECU 30 corresponds to acceleration/deceleration characteristic setting means and steering characteristic setting means described in the appended claims.

The brake pedal sensor 10 is a sensor which detects an operation angle of a brake pedal operated by the driver. The brake pedal sensor 10 detects a brake pedal angle and transmits the brake pedal angle as a brake pedal angle signal to the ECU 30.

The accelerator pedal sensor 11 is a sensor which detects an operation angle of an accelerator pedal operated by the driver. The accelerator pedal sensor 11 detects an accelerator pedal angle and transmits the accelerator pedal angle as an accelerator pedal angle signal to the ECU 30.

The steering angle sensor 12 is a sensor which detects a steering angle (steering wheel angle) input from a steering wheel by the driver. The steering angle sensor 12 detects a steering angle and transmits the steering angle as a steering angle signal to the ECU 30.

The tire angle sensor 13 is a sensor which detects a tire angle of turning wheels of a vehicle. The tire angle sensor 13 detects a tire angle and transmits the tire angle as a tire angle signal to the ECU 30.

The yaw rate sensor 14 is a sensor which detects a yaw rate generated in the own vehicle. The yaw rate sensor 14 detects a yaw rate and transmits the yaw rate as a yaw rate signal to the ECU 30.

The wheel speed sensor 15 is a sensor which is provided at each of four wheels of the vehicle and detects a rotation speed of the wheel (the number of pulses according to rotation of the wheel). The wheel speed sensor 15 detects the number of pulses of the wheel for every predetermined time and transmits the detected number of pulses according to rotation of the wheel as a wheel speed signal to the ECU 30. The ECU 30 calculates a wheel speed from the rotation speed of each wheel and calculates a vehicle body speed (vehicle speed) from the wheel speed of each wheel.

The obstacle detection sensor 16 is a sensor which includes a millimeter wave radar or a processing device and detects an obstacle (a vehicle or the like) in front of the own vehicle. The obstacle detection sensor 16 irradiates millimeter waves forward by the millimeter wave radar and receives return millimeter waves reflected by an object. The obstacle detection sensor 16 detects presence/absence of an obstacle on the basis of transmitted/received data of millimeter waves by the processing device, and when an obstacle can be detected, calculates a distance to the obstacle or the like. The obstacle detection sensor 16 transmits information regarding a detected obstacle or calculated information as an obstacle detection signal to the ECU 30. As a method of detecting an obstacle, any method may be used. For example, a method using an image captured by a camera, a method using a captured image and radar information, such as millimeter waves, or an acquisition method by infrastructure communication may be used.

The VSC device 17 is a device which detects a skid state of the vehicle and controls a brake force or a drive force of each wheel to prevent the skid state. In particular, the VSC device 17 estimates a road surface frictional coefficient from the wheel speed of each wheel and the vehicle body speed and transmits the estimated road surface frictional coefficient as a VSC signal to the ECU 30. As a method of acquiring a road surface frictional coefficient, any method may be used. For example, a method which carries out an estimation arithmetic operation in the driving assist device 1, or an acquisition method by infrastructure communication may be used.

The throttle actuator 20 is an actuator which adjusts the opening degree of a throttle valve (consequently, engine output). When receiving an engine control signal from the ECU 30, the throttle actuator 20 operates in accordance with the engine control signal and adjusts the opening degree of the throttle valve.

The brake actuator 21 is an actuator which adjusts hydraulic brake pressure (consequently, a brake force) of a wheel cylinder of each wheel. When receiving a brake control signal from the ECU 30, the brake actuator 21 operates in accordance with the brake control signal and adjusts hydraulic brake pressure of the wheel cylinder.

The gear ratio variable actuator 22 is an actuator which can arbitrarily control a difference between a steering wheel angle and a tire angle (the degree of change in the tire angle with respect to the steering wheel angle), and arbitrarily changes the tire angle of the turning wheels. Thus, the ratio of reduction of the tire angle with respect to the steering wheel angle (a gear ratio in a steering mechanism) arbitrarily changes. When receiving a gear ratio variable control signal from the ECU 30, the gear ratio variable actuator 22 changes the tire angle in accordance with the gear ratio variable control signal.

The ECU 30 is an electronic control unit which includes a CPU [Central Processing Unit], a ROM [Read Only Memory], a RAM [Random Access Memory], and the like, and performs overall control of the driving assist device 1. The ECU 30 receives signals from the respective sensors 10 to 16 and the VSC device 17 for every predetermined time. The ECU 30 performs acceleration/deceleration control during normal traveling, and transmits an engine control signal to the throttle actuator 20 or transmits a brake control signal to the brake actuator 21. The ECU 30 also performs steering control during normal traveling and transmits a gear ratio variable control signal to the gear ratio variable actuator 22. When the driver wants to experience tail slide traveling, the ECU 30 also performs tail slide traveling control (acceleration/deceleration control and steering control), transmits a gear ratio variable control signal to the gear ratio variable actuator 22, and transmits an engine control signal to the throttle actuator 20 or transmits a brake control signal to the brake actuator 21. The tail slide traveling control is executed only when the driver selects a tail slide traveling mode by a switch or the like. If the tail slide traveling mode is selected, the driver starts traveling at a predetermined vehicle speed on a circular path having a predetermined radius.

The acceleration/deceleration control will be described. First, the ECU 30 calculates an induced target acceleration/deceleration for every predetermined time. As a calculation method, any method may be used. For example, a method may be used which obtains a target acceleration/deceleration (induced target acceleration/deceleration) for use in an ACC device or automatic drive. Specifically, information by the obstacle detection sensor 16 is used, and when there is a preceding vehicle, an inter-vehicle time is calculated from the inter-vehicle distance from the vehicle to the preceding vehicle and general PID control is performed in accordance with a deviation between the inter-vehicle time and a target inter-vehicle time to calculate an induced target acceleration. When there is no preceding vehicle, general PID control is performed in accordance with a deviation between a detected actual vehicle speed and a target vehicle speed to calculate an induced target acceleration.

Each time the induced target acceleration/deceleration is calculated, the ECU 30 creates an accelerator angle/brake angle-acceleration/deceleration correspondence map GM1. A specific method of creating the accelerator angle/brake angle-acceleration/deceleration correspondence map GM1 will be described with reference to FIG. 2. In this map, the horizontal axis represents an accelerator operation amount and a brake operation amount by the driver (the positive side represents an accelerator pedal angle and the negative side represents a brake pedal angle), and the vertical axis represents an acceleration/deceleration of the vehicle (the positive side represents an acceleration and the negative side represents a deceleration).

First, a basic map BM1 is created in which the acceleration/deceleration corresponds to the accelerator pedal angle and the brake pedal angle with a slope of 45° within a range from the maximum accelerator pedal angle to the maximum brake pedal angle (alternatively, the basic map BM1 is prepared in advance). If an induced target acceleration/deceleration is calculated, an intersection P1 between the basic map BM1 and the induced target acceleration/deceleration is obtained. Near the induced target acceleration/deceleration, the acceleration/deceleration is hard to change with respect to change in the accelerator pedal angle or the brake pedal angle. For this reason, in the angle accelerator angle/brake angle-acceleration/deceleration correspondence map GM1, an angle θ1 when passing through an intersection P1 is determined within a range of 0°<θ<45°. For example, the angle θ1 when passing through the intersection P1 is determined by Equation (1).

[Equation 1]

$$\theta1 = \min(\text{inter-vehicle distance}(m) \times k1, 45) \quad (1)$$

Here, k1 is an adjusted coefficient and is, for example, 0.5 (when the inter-vehicle distance is 90 m, induction is not required).

If the angle θ1 becomes 0°, a dead zone is produced in which the acceleration/deceleration does not change with respect to the accelerator pedal angle or the brake pedal angle. If the angle θ1 becomes 45°, the acceleration/deceleration changes with respect to the accelerator pedal angle or the brake pedal angle in the same manner as in the basic map BM1. If the angle θ1 is greater than 45°, change in the acceleration/deceleration with respect to the accelerator pedal angle or the brake pedal angle is greater than the basic map BM1. If the angle is smaller than 0°, the acceleration/deceleration changes in reverse direction to the direction of change in the accelerator pedal angle or the brake pedal angle. Thus, it is assumed that the angle θ1 is within the range of 0°<θ<45°, and near the induced target acceleration/deceleration, change in the acceleration/deceleration with respect to the accelerator pedal angle or the brake pedal angle is smaller than the basic map BM1.

Under the conditions of passing through the intersection P1 at the angle θ1 and intersecting the basic map BM1 at the maximum accelerator pedal angle and the maximum brake pedal angle, the accelerator angle/brake angle-acceleration/deceleration correspondence map GM1 is created by a general curve expression (for example, a spline curve).

In the accelerator angle/brake angle-acceleration/deceleration correspondence map GM1, when the acceleration/deceleration is near the induced target acceleration/deceleration, the acceleration/deceleration is hard to change with respect to the accelerator pedal angle or the brake pedal angle. In particular, as the angle θ1 when passing through the intersection P1 is close to 0°, the acceleration/deceleration is hard to change with respect to the change in the accelerator pedal angle or the brake pedal angle. Thus, near the induced target acceleration/deceleration, an acceleration/deceleration near the induced target acceleration/deceleration is easily maintained, such that a target acceleration/deceleration can be easily achieved even by a manual operation.

Meanwhile, as the acceleration/deceleration is away from near the induced target acceleration/deceleration, the acceleration/deceleration easily changes with respect to the change in the accelerator pedal angle or the brake pedal angle. In particular, as the maximum accelerator pedal angle or the maximum brake pedal angle is approached, the acceleration/deceleration easily changes with respect to the change in the accelerator pedal angle or the brake pedal angle, as compared with the acceleration/deceleration characteristics of the basic map BM1. Thus, in a region other than near the induced target acceleration/deceleration, the acceleration/deceleration changes in accordance with the accelerator pedal angle or the brake pedal angle, and traveling by a manual operation can be easily carried out.

In the accelerator angle/brake angle-acceleration/deceleration correspondence map GM1, as the acceleration/deceleration is near the induced target acceleration/deceleration, the acceleration/deceleration is hard to change, as compared with the characteristics of the basic map BM1, and if the acceleration/deceleration is away from the induced target acceleration/deceleration, the acceleration/deceleration approaches the characteristics of the basic map BM1 and becomes the characteristics of the basic map BM1 in time. As the acceleration/deceleration is near the maximum acceleration or the maximum deceleration, the acceleration/deceleration easily changes, as compared with the characteristics of the basic map BM1. Thus, the accelerator angle/brake angle-acceleration/deceleration correspondence map GM1 becomes a map in which the acceleration/deceleration characteristics change non-linearly.

Thus, in the accelerator angle/brake angle-acceleration/deceleration correspondence map GM1, the range of an accelerator pedal angle or a brake pedal angle corresponding to an acceleration/deceleration near the induced target acceleration/deceleration (corresponding to a target acceleration/deceleration described in the appended claims) is greater than the range of an accelerator pedal angle or a brake pedal angle corresponding to an acceleration/deceleration of a region other than near the induced target acceleration/deceleration (corresponding to an acceleration/deceleration other than a target acceleration/deceleration described in the appended claims).

If the accelerator angle/brake angle-acceleration/deceleration correspondence map GM1 is created, the ECU 30 acquires an actual brake pedal angle from the brake pedal sensor 10 and acquires an actual accelerator pedal angle from the accelerator pedal sensor 11. Next, the ECU 30 extracts an acceleration/deceleration according to the actual accelerator pedal angle or the actual brake pedal angle from the accelerator angle/brake angle-acceleration/deceleration correspondence map GM1, and sets the acceleration/deceleration as a controlled target acceleration/deceleration. Next, the ECU 30 calculates an actual vehicle speed on the basis of information by the wheel speed sensor 15, and calculates an actual acceleration/deceleration from temporal changes of the vehicle speed. Next, the ECU 30 determines one of acceleration control and deceleration control on the basis of a difference between the controlled target acceleration/deceleration and the actual acceleration/deceleration. Finally, in the case of acceleration control, the ECU 30 generates an engine control signal for allowing the actual acceleration/deceleration to achieve the controlled target acceleration/deceleration on the basis of the difference between the controlled target acceleration/deceleration and the actual acceleration/deceleration by general PID control, and transmits the engine control signal to the throttle actuator 20. In the case of deceleration control, the ECU 30 generates a brake control signal for allowing the actual acceleration/deceleration to achieve the controlled target acceleration/deceleration, and transmits the brake control signal to the brake actuator 21.

When there is no induced target acceleration/deceleration, in the case of acceleration control, the ECU 30 generates an engine control signal in accordance with an accelerator pedal angle input by the driver on the basis of the basic map BM1 and transmits the engine control signal to the throttle actuator 20. In the case of deceleration control, the ECU 30 generates a brake control signal in accordance with a brake pedal angle input by the driver and transmits the brake control signal to the brake actuator 21.

The steering control will be described. First, the ECU 30 calculates an induced target tire angle for traveling of the vehicle along a target trace for every predetermined time. As a calculation method, any method may be used. For example, a method may be used which obtains an induced target tire angle from a target trace for use in lane keeping or automatic drive. Specifically, a center line (target trace) between a pair of white lines (lanes) acquired by a white line detection sensor (not shown) and an offset of the own vehicle with respect to the center line or a yaw angle of the own vehicle (that is, the relative position of the own vehicle with respect to the target trace) are acquired. Then, an induced target tire angle for traveling of the own vehicle along the target trace is calculated on the basis of the relative position of the own vehicle with respect to the target trace by using general PID control.

Each time the induced target tire angle is calculated, the ECU 30 creates a steering wheel angle-tire angle correspondence map GM2 corresponding to a gear ratio map in a steering mechanism. A specific method of creating the steering wheel angle-tire angle correspondence map GM2 will be described with reference to FIG. 3. In this map, the horizontal axis represents a steering wheel angle, and vertical axis represents a tire angle. The positive side represents a right rotation direction, and the negative side represents a left rotation direction.

First, a basic map BM2 in which a tire angle corresponds to a steering wheel angle with a slope of 45° is created within a range from the right maximum steering wheel angle to the left maximum steering wheel angle. If an induced target tire angle is calculated, an intersection P2 between the basic map BM2 and the induced target tire angle is obtained. Then, near the induced target tire angle, the tire angle is hard to change with respect to change in the steering wheel angle. For this reason, in the steering wheel angle-tire angle correspondence map GM2, an angle θ2 when passing through the intersection P2 is determined within a range of 0°<θ<45°. For example, the angle θ2 when passing through the intersection P2 is determined by Equation (2).

[Equation 2]

$$\theta 2 = \min((\text{road width}(m) - \text{vehicle width}(m)) \times k2, 45) \quad (2)$$

Here, k2 is an adjusted coefficient and is, for example, 10 (when a road margin is 4.5 m, induction is not required).

If the angle θ2 becomes 0°, a dead zone is produced in which the tire angle does not change with respect to the steering wheel angle. If the angle θ2 becomes 45°, the tire angle changes with respect to the steering wheel angle in the same manner as in the basic map BM2. If the angle θ2 is greater than 45°, the tire angle more quickly changes with respect to the steering wheel angle than the basic map BM2. If the angle is smaller than 0°, the tire angle changes in reverse direction to the rotation direction of the steering wheel angle. Thus, it is assumed that the angle θ2 is within the range of 0°<θ<45°, and near the induced target tire angle, the tire angle more dully changes with respect to the steering wheel angle than the basic map BM2.

Under the conditions of passing through the intersection P2 at the angle θ2 and intersecting the basic map BM2 at the right maximum steering wheel angle and the left maximum steering wheel angle, the steering wheel angle-tire angle correspondence map GM2 is crated by a general curve expression.

In the steering wheel angle-tire angle correspondence map GM2, when the tire angle is near the induced target tire angle, the tire angle is hard to change with respect to change in the steering wheel angle, and the gear ratio (reduction gear ratio) in the steering mechanism is greater than the gear ratio of the basic map BM2. In particular, if the angle θ2 when passing through the intersection P2 approaches 0°, the tire angle is hard to change with respect to the change in the steering wheel angle, and the gear ratio in the steering mechanism increases. Thus, near the induced target tire angle, a tire angle near the induced target tire angle is easily maintained, and traveling on a target trace can be easily carried out (there is a strong tendency to induce the vehicle to the target trace).

Meanwhile, as the tire angle is away from near the induced target tire angle, the tire angle easily changes with respect to the change in the steering wheel angle, and the gear ratio in the steering mechanism decreases. In particular, as the right maximum steering wheel angle or the left maximum steering wheel angle is approached, the tire angle easily changes quickly with respect to the change in the steering wheel angle, and the gear ratio in the steering mechanism becomes smaller than the gear ratio of the basic map BM2. Thus, in a region of a tire angle other than the induced target tire angle, the tire angle changes in accordance with the steering wheel angle, and traveling by a manual operation can be easily carried out.

In the steering wheel angle-tire angle correspondence map GM2, as the tire angle approaches the induced target tire angle, the gear ratio increases. If the tire angle is away from the induced target tire angle, the gear ratio approaches the gear ratio of the basic map BM2 and becomes the gear ratio of the basic map BM2 in time. As the right maximum tire angle or the left maximum tire angle is approached, the gear ratio decreases. Thus, the steering wheel angle-tire angle correspondence map GM2 becomes a map in which the gear ratio change non-linearly.

Therefore, in the steering wheel angle-tire angle correspondence map GM2, the range of a steering wheel angle corresponding to a tire angle near the induced target tire angle (corresponding to a target tire angle described in the appended claims) is greater than the range of a steering wheel angle corresponding to a tire angle of a region other than the tire angle near the induced target tire angle (corresponding to a tire angle other than the target tire angle described in the appended claims).

If the steering wheel angle-tire angle correspondence map GM2 is created, the ECU 30 acquires an actual steering wheel angle from the steering angle sensor 12. Next, the ECU 30 extracts a tire angle according to the actual steering wheel angle from the steering wheel angle-tire angle correspondence map GM2, and sets the tire angle as a controlled target tire angle. The ECU 30 also acquires an actual tire angle from the tire angle sensor 13. Finally, the ECU 30 generates a gear ratio variable control signal for allowing the actual tire angle to achieve the controlled target tire angle on the basis of a difference between the controlled target tire angle and the actual tire angle by general PID control, and transmits the gear ratio variable control signal to the gear ratio variable actuator 22.

When there is no induced target tire angle, the ECU 30 generates a gear ratio variable control signal in accordance with a steering wheel angle input by the driver on the basis of the basic map BM2, and transmits the gear ratio variable control signal to the gear ratio variable actuator 22.

The tail slide traveling control will be described. First, the ECU 30 acquires a steering wheel angle by the steering angle sensor 12, a yaw rate by the yaw rate sensor 14, a wheel speed by the wheel speed sensor 15, a road surface frictional coefficient (estimated value) of the VSC device 17, and the like. The ECU 30 determines whether the own vehicle which is traveling on a circular path is grip-traveling or not on the basis of the wheel speed, the steering wheel angle, the yaw rate, and the like. As a determination method, any method may be used. For example, a method which is used in a VSC device (revolution=rotation determination) may be used.

When the own vehicle is not grip-traveling, if under-steer occurs due to overspeed, the ECU 30 performs the above-described acceleration/deceleration control with a decelera- tion induced deceleration (for example, −0.01 G) as an induced target acceleration/deceleration. The deceleration induced deceleration is a deceleration for achieving a vehicle speed lower than a current vehicle speed, and may be a predetermined value set in advance or a variable value according to the current vehicle speed. To eliminate the under-steer state, a deceleration operation of the driver is required; however, the deceleration induced deceleration can be easily achieved by driving assist through the acceleration/deceleration control. In particular, in the accelerator angle/brake angle-acceleration/deceleration correspondence map GM1, as the angle θ1 when passing the intersection P1 approaches 0°, the deceleration induced deceleration can be easily achieved.

When the own vehicle is grip-traveling, the ECU 30 determines whether tail slide by an accelerator operation of the driver starts or not on the basis of the yaw rate and the like. As a determination method, any method may be used. For example, a method which is used in a VSC device may be used. Here, to obtain motivation for tail slide, deceleration (for example, 100 ms and −0.2 G) by an accelerator-off operation of the driver in a short time and immediate acceleration by an accelerator-on operation (for example, 500 ms and 0.3 G) are carried out. With the deceleration and subsequence acceleration, a load is applied to the front side of the own vehicle, yaw is generated toward the inside of the circular path, and tail slide starts. Incidentally, all the operations may be carried out on the device side; however, if the timing of motivation is not suitable for the will of the driver, simple automatic driving is carried out, such that it is necessary to start tail slide traveling with a complete manual operation or a predetermined operation of the driver as motivation.

If tail slide (consequently, spin) starts, the ECU 30 calculates a counter induced tire angle. The counter induced tire angle is a tire angle which puts on a counter for stopping a spin state of the own vehicle, and is calculated by a calculation method, which is used in a VDIM [Vehicle Dynamics Integrated Management] device, for example. The ECU 30 performs the above-described steering control with the counter induced tire angle as the induced target tire angle. At this time, while a counter steering operation by the driver is required, the counter induced tire angle can be easily achieved by driving assist though the steering control. In particular, in the steering wheel angle-tire angle correspondence map GM2, as the angle θ2 passing through the intersection P2 approaches 0°, the counter induced tire angle can be easily achieved.

During the counter induced steering control, the ECU 30 determines whether the spin state stops or not on the basis of the yaw rate and the like. As a determination method, any method may be used. For example, a method which is used in a VSC device may be used. The ECU 30 performs the counter steering operation control until the spin state is eliminated.

If the spin state stops, the ECU 30 calculates a tail slide maintenance virtually induced acceleration/deceleration on the basis of the road surface frictional coefficient and the wheel speed. The tail slid maintenance virtually induced acceleration/deceleration is an acceleration/deceleration which is necessary to maintain a tail slide state. Actually, since the tire skids, a virtually induced acceleration/deceleration is used. As a calculation method, any method may be used. For example, a method may be used in which a slip ratio for maintaining a cornering force of each rear wheel is calculated, the induced number of rotations of each rear wheel is obtained, and back calculation is carried out from the road surface frictional coefficient. Then, the ECU 30 performs the above-described acceleration/deceleration control with the tail slide maintenance virtually induced acceleration/deceleration as the induced target acceleration/deceleration. At this time, while an acceleration/deceleration operation by the driver is required, the tail slide maintenance virtually induced acceleration/deceleration can be easily achieved by driving assist through the acceleration/deceleration control. In particular, in the accelerator angle/brake angle-acceleration/deceleration correspondence map GM1, as the angle θ1 when passing through the intersection P1 approaches 0°, the tail slide maintenance virtually induced acceleration/deceleration can be easily achieved.

The ECU 30 calculates a tail slide maintenance induced tire angle. The tail slide maintenance induced tire angle is a tire angle which is necessary to maintain a tail slide state. As a calculation method, any method may be used. For example, a method may be used in which a tire angle is calculated based on a circular path (known) on which the own vehicle is traveling and the vehicle model of the own vehicle may be used. Then, the ECU 30 performs the above-described steering control with the tail slide maintenance induced tire angle as the induced target tire angle. At this time, while a steering operation by the driver is required, the tail slide maintenance induced tire angle can be easily achieved by driving assist through the steering control. In particular, in the steering wheel angle-tire angle correspondence map GM2, as the angle θ2 when passing through the intersection P2 approaches 0°, the tail slide maintenance induced tire angle can be easily achieved.

During the tail slide maintenance control, the ECU 30 determines whether the tail slide state stops or not on the basis of the yaw rate or the like. As a determination method, any method may be used. For example, a method which is used in a VSC device may be used. The ECU 30 performs the above-described tail slide maintenance control until the tail slide state is eliminated. Incidentally, the tail slide state is eliminated by a deceleration operation of the driver or the like.

Figure 4:
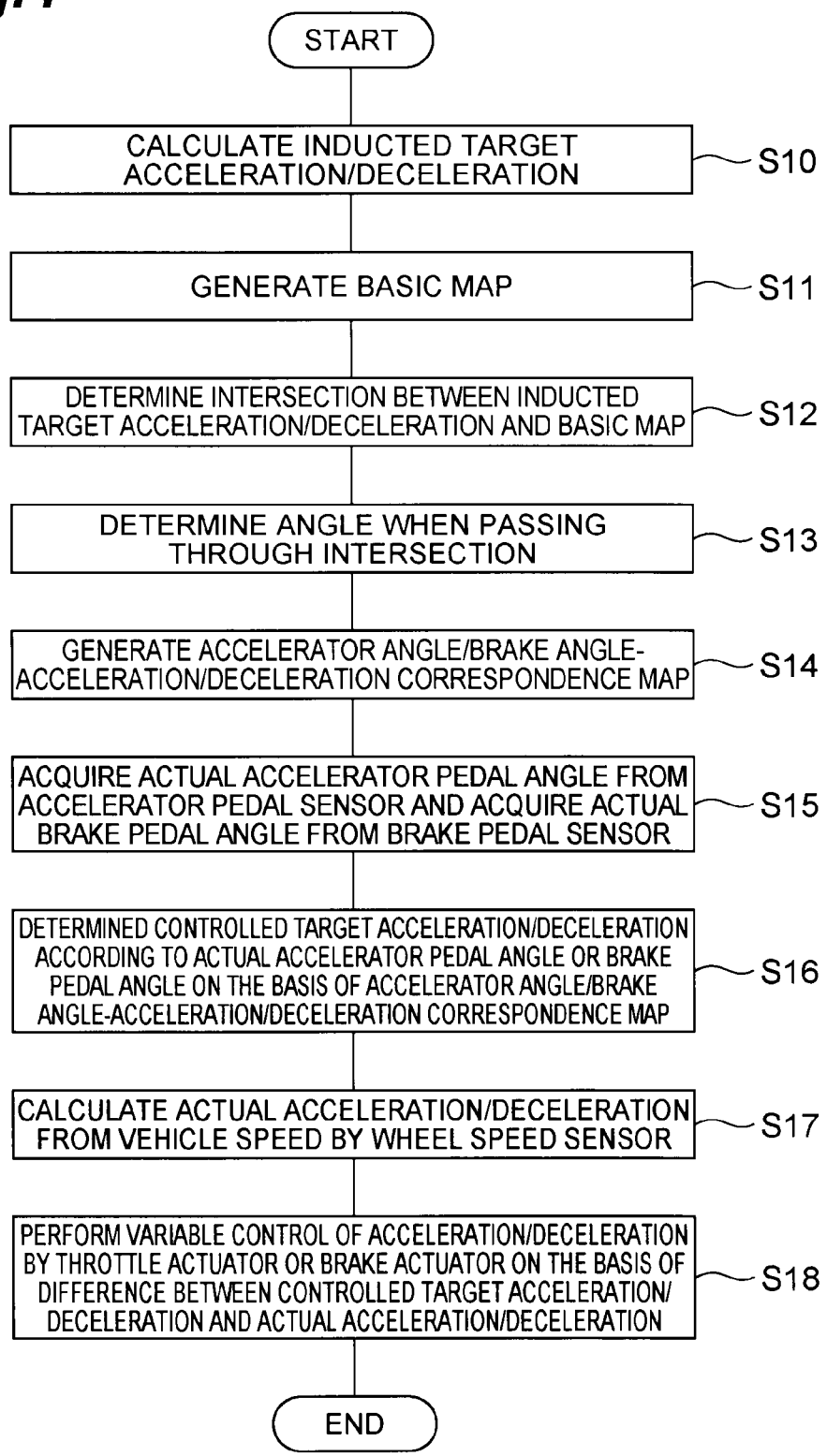
FIG. 4 is a flowchart showing a flow of acceleration/deceleration control in an ECU of FIG. 1.
Figure 5:
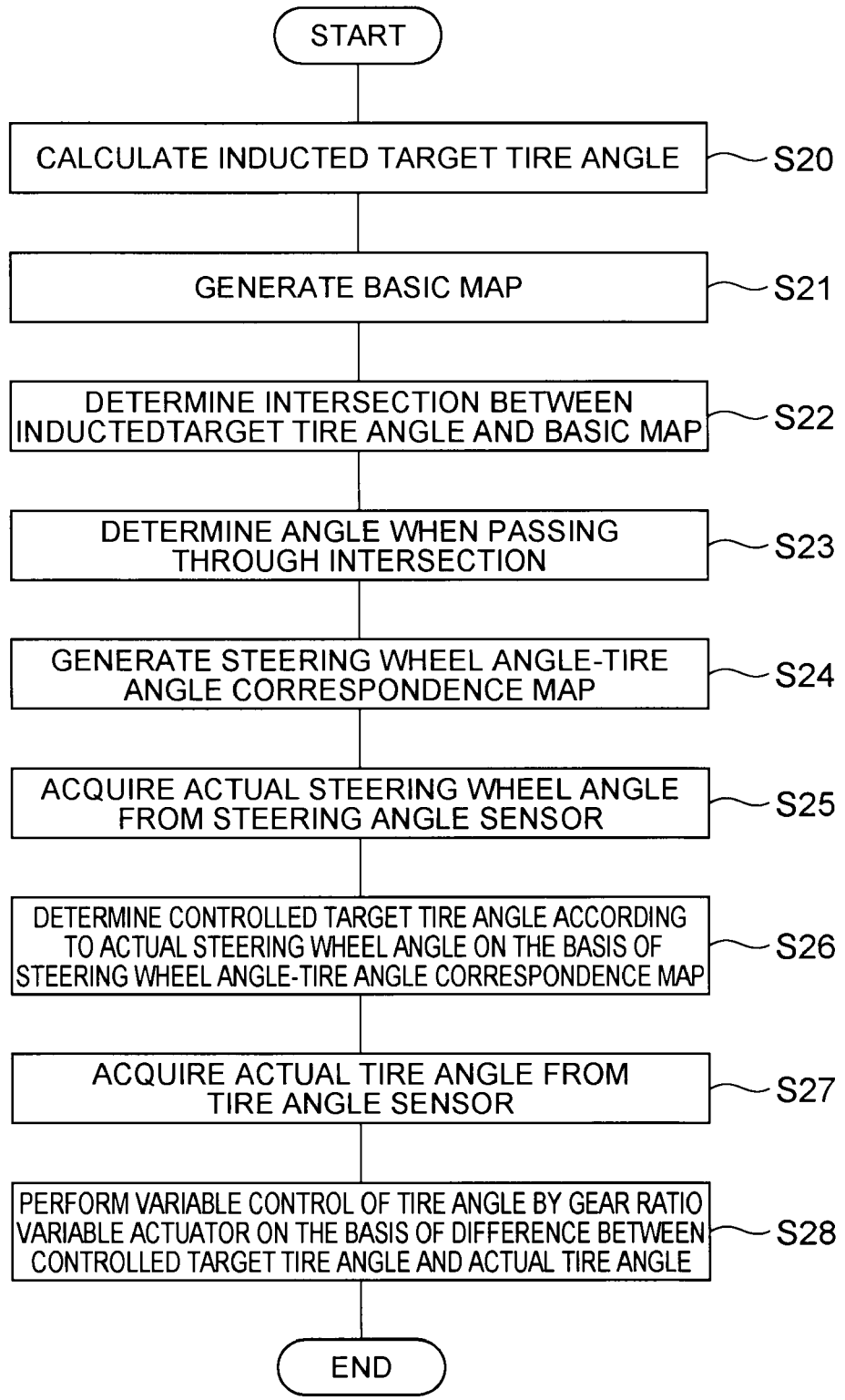
FIG. 5 is a flowchart showing a flow of steering control in the ECU of FIG. 1.
Figure 6:
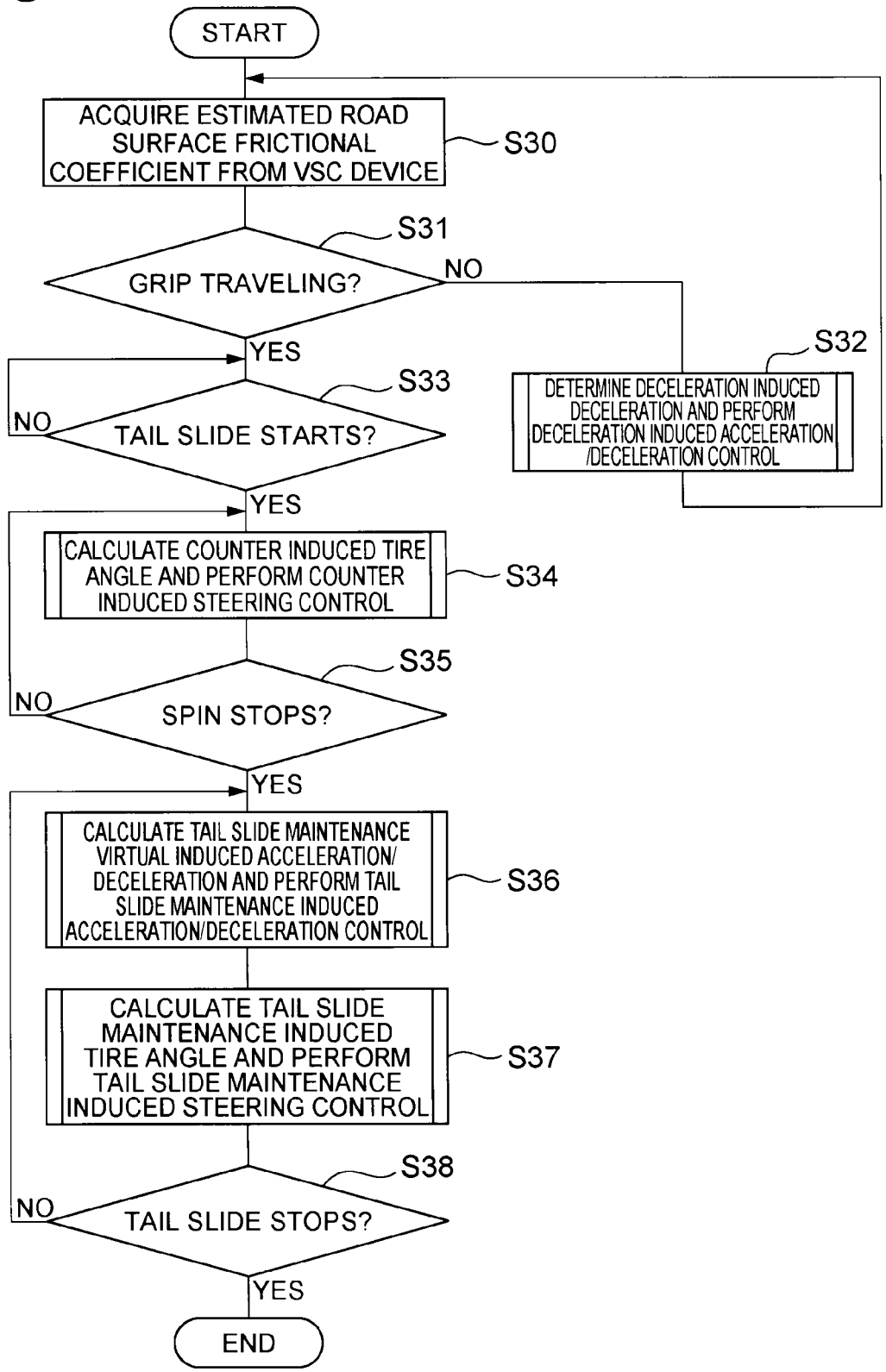
FIG. 6 is a flowchart showing a flow of tail slide traveling control in the ECU of FIG. 1.

The operation of the driving assist device 1 will be described with reference to FIGS. 1 to 3. Here, a case where there is a preceding vehicle, and a vehicle is traveling to follow the preceding vehicle and a case where the driver selects a tail slide traveling mode and tail slide traveling is carried out will be described. In particular, the processing in the ECU 30 will be described with reference to flowcharts of FIGS. 4, 5, and 6. FIG. 4 is a flowchart showing a flow of acceleration/deceleration control in the ECU of FIG. 1. FIG. 5 is a flowchart showing a flow of steering control in the ECU of FIG. 1. FIG. 6 is a flowchart showing a flow of tail slide traveling control in the ECU of FIG. 1.

The brake pedal sensor 10 detects a brake pedal angle and transmits a brake pedal angle signal to the ECU 30 for every predetermined time. The accelerator pedal sensor 11 detects an accelerator pedal angle and transmits an accelerator pedal angle signal to the ECU 30. The steering angle sensor 12 detects a steering angle and transmits a steering angle signal to the ECU 30. The tire angle sensor 13 detects a tire angle and transmits a tire angle signal to the ECU 30. The yaw rate sensor 14 detects a yaw rate and transmits a yaw rate signal to the ECU 30. The wheel speed sensor 15 of each wheel detects the number of pulses according to rotation of the wheel for every predetermined time and transmits a wheel speed signal to the ECU 30. The obstacle detection sensor 16 detects whether there is another vehicle or the like in front of the own vehicle or not on the basis of information of the millimeter wave radar, when there is another vehicle or the like, calculates the inter-vehicle distance from the own vehicle to another vehicle, and transmits an obstacle detection signal to the ECU 30. The VSC device 17 estimates a road surface frictional coefficient from the wheel speed of each wheel and the vehicle body speed, and transmits the road surface frictional coefficient as a VSC signal to the ECU 30. The ECU 30 receives the respective signals from the respective sensors 10 to 16 and the VSC device 17. The ECU 30 calculates the wheel speed from the rotation speed of each wheel, and calculates the vehicle body speed (vehicle speed) from the wheel speed of each wheel.

First, a case where a vehicle is traveling to follow a preceding vehicle will be described. The ECU 30 calculates an inter-vehicle time from the preceding vehicle on the basis of information from the obstacle detection sensor 16 and calculates an induced target acceleration/deceleration for allowing the inter-vehicle time to achieve a target inter-vehicle time for every predetermined time (S10).

Each time the induced target acceleration/deceleration is calculated, the ECU 30 generates the basic map BM1 in which the acceleration/deceleration corresponds to the accelerator pedal angle and the brake pedal angle with a slope of 45° (S11). Next, the ECU 30 determines the intersection P1 between the induced target acceleration/deceleration and the basic map BM1 (S12). Next, the ECU 30 determines the angle θ1 (0°<θ<45° when passing through the intersection P1 (S13). Next, the ECU 30 generates the accelerator angle/brake angle-acceleration/deceleration correspondence map GM1 having a curve, which passes through the intersection P1 at the angle θ1 and intersects the basic map BM1 at the maximum accelerator pedal angle and the maximum brake pedal angle (S14).

The ECU 30 acquires an actual accelerator pedal angle by the accelerator pedal sensor 11 and an actual brake pedal angle by the brake pedal sensor 10 (S15). Next, the ECU 30 determines a controlled target acceleration/deceleration according to the actual accelerator pedal angle or the actual brake pedal on the basis of the accelerator angle/brake angle-acceleration/deceleration correspondence map GM1 (S16). Next, the ECU 30 calculates the vehicle speed on the basis of information by the wheel speed sensor 15, and calculates an actual acceleration/deceleration from temporal changes of the vehicle speed (S17). Next, the ECU 30 generates an engine control signal or a brake control signal on the basis of the difference between the controlled target acceleration/deceleration and the actual acceleration/deceleration, and transmits the engine control signal to the throttle actuator 20 or transmits the brake control signal to the brake actuator 21 (S18). When receiving the engine control signal, the throttle actuator 20 changes the opening degree of the throttle valve in accordance with the engine control signal. Alternatively, when receiving the brake control signal, the brake actuator 21 changes the hydraulic brake pressure of the wheel cylinder in accordance with the brake control signal. Thus, the acceleration/deceleration of the own vehicle is controlled to achieve a controlled target acceleration/deceleration corresponding to the actual accelerator pedal angle or the brake pedal angle obtained from the accelerator angle/brake angle-acceleration/deceleration correspondence map GM1.

When the driver carries out an accelerator operation or a brake operation to follow the preceding vehicle, the acceleration/deceleration comes near the induced target acceleration/deceleration in accordance with the accelerator operation or the brake operation. At this time, even when the driver operates the accelerator pedal or the brake pedal to a certain degree, the acceleration/deceleration does not almost change, such that the acceleration/deceleration near the induced target acceleration/deceleration can be easily maintained. Further, there is a small change in the acceleration/deceleration with respect to change in the accelerator pedal angle or the brake pedal angle, such that the driver can easily carry out fine adjustment of the acceleration/deceleration. For this reason, traveling can be easily carried out in a state where the inter-vehicle distance with respect to the preceding vehicle is maintained.

When the driver carries out an accelerator operation or a brake operation to stop to follow the preceding vehicle and to travel at a predetermined speed, the acceleration/deceleration becomes an acceleration/deceleration, which is slightly shifted from near the induced target acceleration/deceleration, in accordance with the accelerator operation or the brake operation. At this time, the driver can easily carry out an accelerator operation or a brake operation in accordance with the driver's intention, and the acceleration/deceleration changes in accordance with the accelerator operation or the brake operation. For this reason, traveling at a vehicle speed intended by the driver can be easily carried out.

When the driver carries out a brake operation to suddenly stop the vehicle (for example, a pedestrian or the like comes out in front of the vehicle and a deceleration operation is carried out to avoid the pedestrian), the acceleration/deceleration comes near the maximum deceleration in accordance with the brake operation. At this time, the driver can rapidly carry out an intended brake operation, and the deceleration rapidly changes in accordance with the brake operation. For this reason, the own vehicle can be rapidly decelerated (stop).

Next, tail slide traveling will be described. The driver selects the tail slide traveling mode, operates the steering wheel so as to achieve a defined radius of turn, and operates the accelerator so as to achieve a predetermined vehicle speed. Thus, the own vehicle is traveling at a predetermined vehicle speed on a circular path.

The ECU 30 acquires the road surface frictional coefficient (estimated value), the wheel speed, the steering wheel angle, the yaw rate, and the like for every predetermined time (S30). Next, the ECU 30 determines whether the own vehicle which is traveling on the circular path is grip-traveling or not on the basis of the wheel speed, the steering wheel angle, the yaw rate, and the like (S31).

When it is determined in S31 that grip traveling is not carried out, and the under-steer state is produced, the ECU 30 sets a deceleration induced deceleration and performs the above-described acceleration/deceleration control (the processing of S10 to S18) with the deceleration induced deceleration as the induced target acceleration/deceleration (S32). Here, the acceleration/deceleration control is repeatedly performed with the deceleration induced deceleration as the induced target acceleration/deceleration until the under-steer state is eliminated and it is determined in S31 that grip traveling is carried out. At this time, while the driver carries out a brake operation, the acceleration/deceleration of the own vehicle easily reaches the deceleration induced deceleration by driving assist through the acceleration/deceleration control.

When it is determined in S31 that grip traveling is carried out, the ECU 30 determines whether the own vehicle starts tail slide or not on the basis of the yaw rate and the like (S33). At this time, the driver carries out an off operation in a short time and a subsequent on operation of the accelerator pedal to generate the tail slide state. With this operation, the rear wheels of the own vehicle skid due to deceleration in a short time and subsequent acceleration, and the own vehicle starts tail slide. In this case, the motivation of tail slide is obtained by a manual operation of the driver, and determination in S33 is repeatedly carried out until it is determined in S33 that tail slide starts.

When it is determined in S33 that tail slide starts, the ECU 30 calculates a counter induced tire angle and performs a counter induced steering control with the counter induced tire angle as the induced target tire angle (S34).

Specifically, if the counter induced tire angle is calculated, the ECU 30 sets the counter induced tire angle as the induced target tire angle (S20).

Each time the induced target tire angle is calculated, the ECU 30 generates the basic map BM2 in which the tire angle corresponds to the steering wheel angle with a slope of 45° (S21). Next, the ECU 30 determines the intersection P2 between the induced target tire angle and the basic map BM2 (S22). The ECU 30 also determines the angle θ2 (0°<θ<45° when passing through the intersection P2 (S23). Next, the ECU 30 generates the steering wheel angle-tire angle correspondence map GM2 having a curve which passes through the intersection P2 at the angle θ2 and intersects the basic map BM2 at the right maximum steering wheel angle and the left maximum steering wheel angle (S24).

The ECU 30 acquires an actual steering wheel angle from the steering angle sensor 12 (S25). Next, the ECU 30 determines a controlled target tire angle according to the actual steering wheel angle on the basis of the steering wheel angle-tire angle correspondence map GM2 (S26). The ECU 30 also acquire an actual tire angle from the tire angle sensor 13 (S27). Next, the ECU 30 generates a gear ratio variable control signal on the basis of a difference between the controlled target tire angle and the actual tire angle, and transmits the gear ratio variable control signal to the gear ratio variable actuator 22 (S28). When receiving the gear ratio variable control signal, the gear ratio variable actuator 22 changes the tire angle in accordance with the gear ratio variable control signal. Thus, the tire angle of the own vehicle is controlled to achieve a controlled target tire angle corresponding to the actual steering wheel angle obtained from the steering wheel angle-tire angle correspondence map GM2.

When the driver carries out a steering wheel operation to put on counter-steer, the tire angle comes near the counter induced tire angle in accordance with the steering wheel operation. At this time, the reduction gear ratio in the steering mechanism is greater than the normal state; however, even when the driver operates the steering wheel to a certain extent, the tire angle does not almost change, such that the tire angle near the counter induced tire angle can be easily maintained.

In particular, when the driver is a beginner, the steering wheel angle-tire angle correspondence map GM2 in which the angle θ2 when passing through the intersection P2 approaches 0° is generated, such that the counter induced tire angle can be easily achieved and counter-steer can be easily put on. To the contrary, when the driver is an experienced, the steering wheel angle-tire angle correspondence map GM2 in which the angle θ2 when passing through the intersection P2 approaches 45° is generated, such that counter-steer can be put on in a state where the degree of driving assist is reduced.

During the counter induced steering control, the ECU 30 determines whether the spin state stops or not on the basis of the yaw rate and the like (S35). In this case, the steering control is repeatedly performed with the counter induced tire angle as the induced target tire angle until the spin state is eliminated by counter-steer of the driver and it is determined in S35 that the spin state stops.

When it is determined in S35 that the spin state stops, the ECU calculates a tail slide maintenance virtually induced acceleration/deceleration on the basis of the road surface frictional coefficient, the wheel speed, and the like, and performs the above-described acceleration/deceleration control (the processing of S10 to S18) with the tail slide maintenance virtually induced acceleration/deceleration as the induced target acceleration/deceleration (S36). The ECU 30 also calculates a tail slide maintenance induced tire angle on the basis of the circular path on which the vehicle is traveling and the vehicle model, and performs the above-described steering control (the processing of S20 to S28) with the tail slide maintenance induced tire angle as the induced target tire angle (S37).

When the driver carries out an accelerator operation or a brake operation to maintain the tail slide state, the acceleration/deceleration comes near the tail slide maintenance virtually induced acceleration/deceleration in accordance with the accelerator operation or the brake operation. At this time, even when the driver operates the accelerator pedal or the brake pedal to a certain extent, the acceleration/deceleration does not almost change, such that the acceleration/deceleration near the tail slide maintenance virtually induced acceleration/deceleration can be easily maintained. When the driver carries out a steering wheel operation to maintain the tail slide state, the tire angle comes near the tail slide maintenance induced tire angle in accordance with the steering wheel operation. At this time, the reduction gear ratio in the steering mechanism is greater than the normal state. For this reason, even when the driver operates the steering wheel to a certain extent, the tire angle does not almost change, such that the tire angle near the tail slide maintenance induced tire angle can be easily maintained.

In particular, as described above, when the driver is a beginner, the accelerator angle/brake angle-acceleration/deceleration correspondence map GM1 in which the angle θ1 approaches 0° and the steering wheel angle-tire angle correspondence map GM2 in which the angle θ2 approaches 0° are generated, such that the tail slide maintenance virtually induced acceleration/deceleration and the tail slide maintenance induced tire angle can be easily achieved, and the tail slide state can be easily maintained. To the contrary, when the driver is an experienced, the accelerator angle/brake angle-acceleration/deceleration correspondence map GM1 in which the angle approaches 45° and the steering wheel angle-tire angle correspondence map GM2 in which the angle θ2 approaches 45° are generated, such that the tail slide state can be maintained in a state where the degree of driving assist is reduced.

During the tail slide maintenance control, the ECU 30 determines whether the tail slide state stops or not on the basis of the yaw rate and the like (S38). In this case, the acceleration/deceleration control with the tail slide maintenance virtually induced acceleration/deceleration as the induced target acceleration/deceleration and the steering control with the tail slide maintenance induced tire angle as the induced target tire angle are repeatedly performed until the tail slide state is eliminated by a brake operation of the driver and it is determined in S38 that the tail slide state stops.

According to the driving assist device 1, with the accelerator angle/brake angle-acceleration/deceleration correspondence map GM1, the acceleration/deceleration characteristics with respect to the accelerator operation amount and the brake operation amount change in accordance with the induced target acceleration/deceleration, and the change in the acceleration/deceleration near the induced target acceleration/deceleration decreases, such that the induced target acceleration/deceleration can be easily achieved even by a manual operation of the driver. In particular, even when the driver is not good at drive, traveling at the induced target acceleration/deceleration can be easily carried out, and fine adjustment near the induced target acceleration/deceleration can be easily carried out.

According to the driving assist device 1, with the accelerator angle/brake angle-acceleration/deceleration correspondence map GM1, as the acceleration/deceleration is away from near the induced target acceleration/deceleration, the change in the acceleration/deceleration increases, such that acceleration or deceleration as desired by the driver can be easily carried out, and traveling outside the induced target acceleration/deceleration can be carried out. In particular, the change in the acceleration/deceleration near the maximum accelerator pedal angle or the maximum brake pedal angle increases, as compared with the normal state, such that rapid acceleration or deceleration can be carried out in accordance with the driver's intention in emergency, such as obstacle avoidance.

In the driving assist device 1, the accelerator angle/brake angle-acceleration/deceleration correspondence map is created in accordance with the induced target acceleration/deceleration. Therefore, the controlled target acceleration/deceleration according to the accelerator pedal angle or the brake pedal angle by the driver can be simply extracted from the accelerator angle/brake angle-acceleration/deceleration correspondence map, and the acceleration/deceleration characteristics can be adjusted in accordance with the accelerator angle/brake angle-acceleration/deceleration correspondence map.

In the driving assist device 1, the steering control is performed with the counter induced tire angle as the induced target tire angle, such that proper counter-steer can be easily put on by a manual operation of the driver. In the driving assist device 1, the acceleration/deceleration control with the tail slide maintenance virtually induced acceleration/deceleration as the induced target acceleration/deceleration and the steering control with the tail slide maintenance induced tire angle as the induced target tire angle are performed. Therefore, the tail slide state can be easily maintained by a manual operation of the driver. As a result, the driver can acquire advanced driving skills, counter-steer or maintenance of the tail slide state, and the improvement in the driving skills enables reduction of the degree of driving assist. Further, the driver can easily experience enjoyable driving.

Although the embodiment of the invention has been described, the invention is not limited to the embodiment and may be executed in various forms.

For example, although in this embodiment, the invention is applied to a driving assist device having an acceleration/deceleration control function, a steering control function, and a tail slide traveling control function, the invention may be applied to a device having only an acceleration/deceleration control function, or the respective functions may be incorporated into different devices.

Although in this embodiment, a single ECU is provided, a plurality of ECUs may be provided.

Although in this embodiment, the acceleration/deceleration characteristics are controlled by adjusting the opening degree of the throttle valve and the wheel cylinder pressure, the acceleration/deceleration characteristics may be controlled by other configuration.

Although in this embodiment, the steering gear ratio is adjusted to control the steering characteristics (reduction gear ratio), the steering characteristics may be controlled by other configuration.

Although in this embodiment, the accelerator angle/brake angle-acceleration/deceleration correspondence map is created, and control is performed to change the acceleration/deceleration by using the accelerator angle/brake angle-acceleration/deceleration correspondence map, control may be performed to change the acceleration/deceleration, without creating such a map.

Although in this embodiment, the steering wheel angle-tire angle correspondence map is created, and control is performed to change the gear ratio (tire angle) by using the steering wheel angle-tire angle correspondence map, control may be performed to change the gear ratio (tire angle), without creating such a map.

As an acceleration according to a manual operation (for example, an accelerator operation or a brake operation) input by the driver approaches a target acceleration/deceleration (induced target acceleration/deceleration), sensitivity to the manual operation may be lowered (that is, the acceleration/deceleration may be hard to change with respect to the change in the manual operation). In addition, in a region where an acceleration according to a manual operation input by the driver is near the target acceleration/deceleration (induced target acceleration/deceleration), sensitivity to the manual operation may be lowered, and in a region where the acceleration is away from the target acceleration/deceleration, sensitivity to the manual operation increases (that is, the acceleration/deceleration may easily change with respect to the change in the manual operation).

An example of a vehicle, not intended to limit the invention, will be described below, in which acceleration responsiveness to an accelerator operator increases as the inter-vehicle distance with respect to the preceding vehicle increases. A vehicle in which the target acceleration/deceleration is calculated in accordance with the inter-vehicle distance with respect to the preceding vehicle is taken into consideration. Specifically, the following configuration is taken into consideration: when the inter-vehicle distance with respect to the preceding vehicle is great, the target acceleration/deceleration is calculated so as to permit acceleration (such that the value increases), as compared with a case where the inter-vehicle distance is small; and when the inter-vehicle distance with respect to the preceding vehicle is small, the target acceleration/deceleration is calculated so as to permit deceleration (such that the value decreases), as compared with a case where the inter-vehicle distance is great. At this time, even when the amount of an acceleration/deceleration operation input by the driver is the same, an actual acceleration of the vehicle changes in accordance with the inter-vehicle distance. When the driver wants to output a predetermined acceleration by an accelerator operation, if the inter-vehicle distance with respect to the preceding vehicle is small, a great amount of stepping of the accelerator operator is required, as compared with a case where the inter-vehicle distance is great. In contrast, when the driver wants to output a predetermined deceleration by a brake operation, if the inter-vehicle distance with respect to the preceding vehicle is great, a great amount of stepping of the brake operator is required, as compared with a case where the inter-vehicle distance is small.

Separately from or in addition to the above-described configuration, the target acceleration/deceleration may be calculated in accordance with an inter-vehicle distance with respect to a succeeding vehicle. For example, when the driver wants to output a predetermined acceleration by an accelerator operation, if the inter-vehicle distance with respect to the succeeding vehicle is great, a great amount of stepping of the accelerator operator is required, as compared with a case where the inter-vehicle distance is small. In contrast, when the driver wants to output a predetermined deceleration by a brake operation, if the inter-vehicle distance with respect to the succeeding vehicle is great, a great amount of stepping of the brake operator is required, as compared with a case where the inter-vehicle distance is small.

The configuration may be applied to a case where, in a vehicle which performs automatic traveling control, such as so-called ACC, when no operation is input by the driver, while the automatic traveling control is being carried out, an acceleration changes in accordance with an operation input by the driver. As another example, in the configuration in which the acceleration/deceleration is essentially controlled constantly (continuously) on the basis of an operation input of the driver, the acceleration/deceleration may be corrected in accordance with a target acceleration/deceleration set in accordance with factors other than an acceleration/deceleration operation from the driver. With such a vehicle, the frequency of occurrence of discomfort related to an operation feeling of the driver is high, such that a significant effect can be expected.

Although in this embodiment, the configuration in which both the acceleration and the deceleration are controlled has been described, either the acceleration or the deceleration may be controlled.

INDUSTRIAL APPLICABILITY

According to the travel control device and the vehicle of the invention, the acceleration/deceleration characteristics with respect to the accelerator operation amount and the brake operation amount are adjusted, such that the target acceleration/deceleration can be easily achieved even by the manual operation of the driver.

The invention claimed is:

1. A travel control device which controls at least acceleration/deceleration of a vehicle, the travel control device comprising:
   acceleration/deceleration characteristic setting means for setting the range of an accelerator operation amount or a brake operation amount corresponding to a target acceleration/deceleration greater than the range of an accelerator operation amount or a brake operation amount corresponding to an acceleration/deceleration other than the target acceleration/deceleration; and
   a basic map which defines the relationship between the accelerator operation amount and the acceleration/deceleration corresponding to the accelerator operation amount and the relationship between the brake operation amount and the acceleration/deceleration corresponding to the brake operation amount,
   wherein the acceleration/deceleration characteristic setting means sets the range of the accelerator operation amount or the brake operation amount corresponding to the acceleration/deceleration for achieving the target acceleration/deceleration greater than the basic map and generates an acceleration/deceleration characteristic map which intersects the basic map at least at a maximum deceleration to a maximum brake operation point.

2. A travel control device which controls at least acceleration/deceleration of a vehicle, the travel control device comprising:
   acceleration/deceleration characteristic setting means for setting the range of an accelerator operation amount or a brake operation amount corresponding to a target acceleration/deceleration greater than the range of an accelerator operation amount or a brake operation amount corresponding to an acceleration/deceleration other than the target acceleration/deceleration;
   steering characteristic setting means for setting the range of a steering operation amount corresponding to a target tire angle greater than the range of a steering operation amount corresponding to a tire angle other than the target tire angle, wherein, when the rear portion of the vehicle skids, the steering characteristic setting means sets the range of the steering operation amount corresponding to the target tire angle for suppressing or/and maintaining skidding greater, and when the rear portion of the vehicle skids, the acceleration/deceleration characteristic setting means sets the range of the accelerator operation amount or the brake operation amount corresponding to the target acceleration/deceleration for maintaining skidding greater.

3. The travel control device according to claim 1,
wherein, as an acceleration or a deceleration according to an operation input by a driver approaches a target acceleration or a target deceleration, sensitivity to the operation input by the driver is lowered.

4. A travel control device which controls at least acceleration/deceleration of a vehicle,
wherein, as an inter-vehicle distance from the vehicle to a preceding vehicle increases, acceleration responsiveness to an accelerator operator input by a driver increases.

5. The travel control device according to claim 1, further comprising:
steering characteristic setting means for setting the range of a steering operation amount corresponding to a target tire angle greater than the range of a steering operation amount corresponding to a tire angle other than the target tire angle,
wherein, when the rear portion of the vehicle skids, the steering characteristic setting means sets the range of the steering operation amount corresponding to the target tire angle for suppressing or/and maintaining skidding greater, and when the rear portion of the vehicle skids, the acceleration/deceleration characteristic setting means sets the range of the accelerator operation amount or the brake operation amount corresponding to the target acceleration/deceleration for maintaining skidding greater.

6. A travel control device which controls at least acceleration/deceleration of a vehicle, the travel control device comprising:
a control unit programmed to set the range of an accelerator operation amount or a brake operation amount corresponding to a target acceleration/deceleration greater than the range of an accelerator operation amount or a brake operation amount corresponding to an acceleration/deceleration other than the target acceleration/deceleration; and
a basic map which defines the relationship between the accelerator operation amount and the acceleration/deceleration corresponding to the accelerator operation amount and the relationship between the brake operation amount and the acceleration/deceleration corresponding to the brake operation amount,
wherein the control unit sets the range of the accelerator operation amount or the brake operation amount corresponding to the acceleration/deceleration for achieving the target acceleration/deceleration greater than the basic map and generates an acceleration/deceleration characteristic map which intersects the basic map at least at a maximum deceleration to a maximum brake operation point.

* * * * *